(12) United States Patent
Zhou

(10) Patent No.: US 8,912,241 B2
(45) Date of Patent: Dec. 16, 2014

(54) RUBBER ASPHALT AND PREPARATION METHOD THEREOF

(76) Inventor: Qiqiang Zhou, Luzhou (CN)

( * ) Notice: Subject to any disclaimer, the term of this patent is extended or adjusted under 35 U.S.C. 154(b) by 71 days.

(21) Appl. No.: 13/643,301

(22) PCT Filed: Apr. 21, 2011

(86) PCT No.: PCT/CN2011/073135
§ 371 (c)(1),
(2), (4) Date: Oct. 25, 2012

(87) PCT Pub. No.: WO2011/134367
PCT Pub. Date: Nov. 3, 2011

(65) Prior Publication Data
US 2013/0041070 A1     Feb. 14, 2013

(30) Foreign Application Priority Data
Apr. 28, 2010  (CN) .......................... 2010 1 0158246

(51) Int. Cl.
| | | |
|---|---|---|
| *C08J 11/04* | (2006.01) | |
| *C04B 26/26* | (2006.01) | |
| *C08L 19/00* | (2006.01) | |
| *C08L 95/00* | (2006.01) | |
| C04B 111/00 | (2006.01) | |
| C08K 5/053 | (2006.01) | |

(52) U.S. Cl.
CPC ............... *C04B 26/26* (2013.01); *C08L 19/003* (2013.01); *C08L 95/00* (2013.01); *C04B 2111/0075* (2013.01); *C08K 5/053* (2013.01); *C08L 2555/22* (2013.01); *C08L 2555/34* (2013.01); *C08L 2555/80* (2013.01); *C08L 2555/86* (2013.01)
USPC ................ 521/44; 521/40; 521/41; 521/42.5; 523/351; 524/59

(58) Field of Classification Search
CPC ...... C04B 26/00; C04B 26/006; C04B 26/26; C04B 18/22; C08L 19/003; C08L 95/00; C08L 2555/22; C08L 2555/34; C08L 2555/80; C08L 2555/86

USPC ........... 521/40, 41, 42.5, 44; 523/351; 524/59
See application file for complete search history.

(56) References Cited

U.S. PATENT DOCUMENTS

| | | | | |
|---|---|---|---|---|
| 4,567,093 | A * | 1/1986 | Sogabe et al. | ................... 442/73 |
| 6,071,857 | A * | 6/2000 | Vogt et al. | ..................... 504/366 |
| 6,783,580 | B2 * | 8/2004 | Tyvoll et al. | ................ 106/31.47 |
| 7,455,805 | B2 * | 11/2008 | Oriakhi et al. | ................. 264/463 |
| 2013/0041070 | A1 | 2/2013 | Zhou | |

FOREIGN PATENT DOCUMENTS

| | | |
|---|---|---|
| CN | 1528823 A | 9/2004 |
| CN | 1609165 A | 4/2005 |
| CN | 1970608 A | 5/2007 |
| CN | 1970638 A | 5/2007 |
| CN | 101275026 A | 10/2008 |
| CN | 101792608 B | 8/2010 |

OTHER PUBLICATIONS

Machine translation of CN 1970638.*
Machine translation of CN 1528823.*

* cited by examiner

*Primary Examiner* — Frances Tischler
(74) *Attorney, Agent, or Firm* — Mei & Mark LLP

(57) ABSTRACT

A rubber asphalt and a preparation method thereof are disclosed. The rubber asphalt comprises matrix asphalt and rubber powder modifier in a ratio of 4:1-4, wherein the rubber powder modifier comprises waste tire rubber powder and hexanediol in a ratio of 94-96:6-4. The method comprises the following steps: mixing the hexanediol with the waste tire rubber powder according to the ratio and stirring and wetting to obtain the rubber powder modifier; placing the matrix asphalt into a reaction kettle and heating to 90-170° C.; adding the rubber powder modifier into the reaction kettle according to the ratio; and raising the temperature to 190-210° C. under the stirring state to obtain the rubber asphalt. The rubber asphalt has an extensibility of 13-19 cm at 5° C., a penetration of 68-75 at 25° C. and a softening point of 53-90° C. The asphalt-aggregate ratio of a mixed material on the subsequent work section can be reduced to 6-8 from 8-10. The rubber asphalt can be used for producing a mixture for highway construction and preventing water and leakage of roofing and tunnel.

2 Claims, No Drawings

RUBBER ASPHALT AND PREPARATION METHOD THEREOF

This is a §371 National Stage application of PCT/CN2011/073135, filed Apr. 21, 2011, which claims the benefit of priority of Chinese Patent Application 201010158246.3 filed Apr. 28, 2012, both of which are incorporated herein by reference.

FIELD OF THE INVENTION

The invention relates to rubber asphalt and a preparation method thereof, in particular to the rubber asphalt and the preparation method thereof used for a wet mixing process.

BACKGROUND OF THE INVENTION

Asphalt is a flexible adhesive used for pavement construction, which has good adhesiveness, waterproofness, insulation and chemical stability, and is an indispensable material for pavement construction.

The quality of pavement asphalt is usually evaluated by following indexes:

Ductility: mainly used for reflecting low temperature performance of asphalt. Ductility of asphalt refers to the length that when two ends of a standard sample is stretched to get ruptured under specified speed and temperature. Ductility means the rupture length when shear pressure on a shear surface is larger than cohesion of asphalt, which is changed with the change of temperature. Ductility reflects the viscoelastic property of asphalt, and can be measured according to the method specified in ASTMD113 or GB/T4508.

Softening point: reflecting high temperature performance of asphalt. The softening point of asphalt means equiviscous temperature of asphalt under a certain condition; high softening point means that the equiviscous temperature of asphalt is high, and the high temperature stability of mixture is good; and the softening point can be measured based on the method specified in ASTMD36 or GB/T4508.

Penetration number: consistency indicator of asphalt. Penetration number reflects hardness of asphalt under a certain condition, and is indicated by vertically penetrating a standard needle into the depth of asphalt sample under conditions of certain load, time and temperature, the unit is $1/10$ nm; the logarithms of penetration number with different temperature are formed into a linear relationship with the temperature, namely $lgP=AT+K$, where P is the penetration number when the temperature is T; A reflects the sensitivity of penetration number logarithmic temperature, which is called penetration temperature coefficient for short; and K is a constant number.

The rigidity and intensity of asphalt under high temperature are reduced due to the temperature sensitivity of asphalt, and the pavement is softened; while at low temperature, the pavement crack phenomenon such as cracking shrinking and the like is easily to be produced; the pavement must be modified, so as to improve the mechanical performance under high and low temperatures, and this is known by technicians in the field. The modifier used for modifying the asphalt is usually a thermoplastic elastomer polymer, such as random or segmented copolymer of styrene and conjugated diene, polyisoprene, butyl rubber and the like; these modifiers can bestow asphalt excellent mechanical performance and dynamic performance, particularly excellent viscoelasticity; however, the price of the asphalt is high, and a large amount of asphalt is required for use, thus, the cost of modified asphalt concrete is increased obviously.

The waste tire contains various macromolecular polymers such as styrene butadiene rubber, natural rubber and the like and a lot of carbon black, antioxidant, filling material, processing oil and the like, thus, the waste rubber particle can be used as modifier after being activated to add into asphalt. The product obtained by mixing the activated rubber powder and asphalt is called rubber asphalt, and also called asphalt rubber. The activated rubber powder swells in the asphalt, thus, the adhesiveness of asphalt is increased, the oil film thickness is thicker and the overall performance of the rubber asphalt is obviously better than that of the matrix asphalt. The advantage of rubber asphalt is very prominent; however, as the activation of waste rubber powder is complex and a large amount of asphalt is required for use, the rubber asphalt currently has the disadvantages of high cost, complex process and strict requirements.

Generally speaking, the content of rubber powder is higher, the pavement performance of corresponding rubber asphalt mixture is better; however, as the existing rubber asphalt increases the thickness of rubber membrane in the mixture, while the adhesiveness of rubber asphalt is increased, the flowability is reduced, thus, the workability of construction of mixture is reduced, thus, the quality of rubber powder in existing rubber asphalt is strictly controlled at 15-20 percent of the gross mass of the mixture; as the increment of the adhesiveness of rubber asphalt is limited, the asphalt-aggregate ratio (mass ratio of rubber asphalt and ore material) of the mixture in later working section is 8 to 10; the use quantity of asphalt is relative large, thus, the cost of rubber asphalt mixture is high, and it is very uneconomical.

At present, the adopted method for activating waste rubber comprises the following steps of adopting a vulcanizing system by using tert-butyl phenol-formaldehyde resin as vulcanizing agent and using stannous chloride as accelerating agent, and improving the vulcanization speed and viscosity by adopting a halogenated method; secondly solving the rubber adhesive property and vulcanization speed of rubber by using activating agent 420 (Alkyl phenol disulphide) under high temperature and increasing the quantity of stannous chloride, so that the waste rubber powder is vulcanized to restore the crude adhesive attachment property, thereby ensuring the mixed melting property with other materials, and reaching the purpose of modifying other materials. That's to say, the normal method for improving the adhesiveness performance of waste rubber particle is to adopt a desulfuration method to reach the purpose, however, the desulfuration process is complex, the environment is polluted severely, and energy resource is wasted, thus, the method is quite uneconomical.

China patent ZL200510022110.9 discloses an modified asphalt and preparation method thereof, the modified asphalt can prevent rubber modifier from separating from asphalt, and has the advantages of good softening point, penetration number and ductility, and activation can be directly conducted during preparing activated rubber powder, thus, the waste tire powder is not required to be desulfurated, and the method is simple. However, the modified asphalt cannot effectively solve the contradiction of the adhesiveness and flowability of rubber asphalt; the content of rubber powder in the modified asphalt is still required to be controlled at 15-20% of the gross mass of the rubber asphalt mixture, and the asphalt-aggregate ratio of the mixture in the later working section is still 8-10, a large amount of asphalt is still required.

SUMMARY OF THE INVENTION

The invention aims to overcome the disadvantage that in the prior art the use quantity of asphalt in rubber asphalt is large, and provides an improved rubber asphalt and preparation method thereof. According to the rubber asphalt provided by the invention, the content of rubber powder can be increased perceptibly, and the asphalt-aggregate ratio for the production of mixture in later working section can be reduced from currently 8-10 to 6-8; and meanwhile, the technical indexes satisfy the industrial standard and the rubber asphalt is very economical.

By realizing the invention purpose, the invention adopts the technical scheme as follows:

A rubber asphalt, which comprises the following components in ratio by weight: 4 to 1-4 of matrix asphalt to rubber modifier;

the rubber powder modifier comprises the following components in ratio by weight: 94-96 to 6-4 of waste tire powder to hexanediol.

A better rubber asphalt scheme is prepared according to the following components in ratio by weight: 1 to 1 of matrix asphalt to rubber modifier.

The preparation method of rubber asphalt in the invention comprises the following steps of (1) adding hexanediol into waste tire powder according to a ratio by weight of 94-96 to 6-4 of waste tire powder to hexanediol, mixing and wetting the mixture to obtain rubber powder modifier;

(2) placing the matrix asphalt into a reaction kettle, heating the matrix asphalt to 90-170 DEG C;

(3) adding the rubber powder modifier in the reaction kettle with a weight ratio of 4 to 1-4 of matrix asphalt to rubber powder modifier under the condition that the temperature is kept at 90 to 170 DEG C; and (4) heating the reaction kettle to 190-210 DEG C under the agitating state, obtaining rubber asphalt.

The rubber powder modifier of the rubber asphalt of the invention is composed of waste tire powder and hexanediol, wherein the hexanediol is a rubber crosslinking agent, which is white powdery or flaky, the chemical component is 2,5-dimethyl-2,5-hexanediol, and the molecular formula is $C_8H_{18}O_2$. Hexanediol has the functions of promoting petroleum asphalt and rubber hydrocarbon molecular to synthesize asphalt matrix at low temperature, and increasing the penetrability of rubber powder modifier. The preparation method of the rubber asphalt provided by the invention is to heat matrix asphalt at 90-170 DEG C, add rubber powder modifier into a reaction kettle in proportion, control the adding speed of the rubber powder modifier, keep temperature within the range, heat the reaction kettle at 190-210 DEG C after adding rubber powder modifier, and obtain the rubber asphalt. The method for preparing rubber asphalt provided by the invention requires no melting and expansion, rubber milling and shearing. The preparation method of rubber asphalt provided by the invention is simple in process, free from three wastes pollution, environment-friendly and easy to be transported and constructed. The rubber asphalt prepared by the method provided by the invention has strong penetrability; the rubber particle is changed into rubber oil at high temperature; some contents of rubber powder enter asphalt to generate fundamental change of asphalt, thereby realizing rubber changing into oil; thus, the contradiction of adhesiveness and flowability of rubber asphalt is solved effectively, the use quantity of rubber powder modifier in rubber asphalt is improved, and the use quantity of asphalt is reduced. As the penetrability of rubber asphalt is enhanced and as the use quantity of rubber powder modifier is increased, the pavement performance of mixture can still be ensured under the condition that more ore materials are doped in the mixture in the later working section, and relative national standards are satisfied. In the invention, the ductility of the rubber asphalt at 5 DEG C is 13-19 cm; the penetration number of the rubber asphalt at 25 DEG C is 68-75; the softening point of the rubber asphalt is 53-90 DEG C; and the asphalt-aggregate ratio of the mixture at the later working section can be reduced from 8-10 to 6-8. The rubber asphalt provided by the invention can be used for producing mixture in pavement construction and waterproofness and leakage of roof tunnel.

DETAILED DESCRIPTION OF THE EMBODIMENTS

Next, concrete embodiments are combined to further describe the invention in details. However, it should not be understood that the scope of the theme of the invention is only limited to the following embodiments; all techniques realized based on the content of the invention should belong to the scope of the invention.

The rubber asphalt cited in the embodiments of the invention is prepared according to following methods:

Embodiment 1

1. The rubber asphalt cited by the embodiment comprises following components in ratio by weight: 4 to 1 of 70# matrix asphalt to rubber powder modifier; said rubber powder modifier comprises the following components in ratio by weight: 96 to 4 of waste tire powder to hexanediol.

The rubber asphalt of the embodiment is prepared by the following method comprising the steps of (1) adding hexanediol into waste tire powder according to a ratio by weight of 96 to 4 of waste tire powder to hexanediol, mixing and wetting the mixture to obtain rubber powder modifier;

(2) placing the matrix asphalt into a reaction kettle, heating the matrix asphalt to 90-110 DEG C;

(3) adding the rubber powder modifier in the reaction kettle with a weight ratio of 4 to 1 of matrix asphalt to rubber powder modifier under the condition that the temperature is kept at 90 to 110 DEG C; and (4) heating the reaction kettle to 190-200 DEG C under the agitating state, agitating 1 minute and obtaining rubber asphalt.

Embodiment 2

The rubber asphalt cited in the embodiment comprises following components in ratio by weight: 4 to 2 of 70# matrix asphalt to rubber powder modifier; the rubber powder modifier comprises the following components in ratio by weight: 95 to 5 of waste tire powder to hexanediol.

The rubber asphalt of the embodiment is prepared by the following method comprising the steps of (1) adding hexanediol into waste tier powder according to a ratio by weight of 95 to 5 of waste tire powder to hexanediol, mixing and wetting the mixture to obtain rubber powder modifier;

(2) placing the matrix asphalt into a reaction kettle, heating the matrix asphalt to 140-150 DEG C;

(3) adding the rubber powder modifier in the reaction kettle with a weight ratio of 4 to 2 of matrix asphalt to rubber powder modifier under the condition that the temperature is kept at 140 to 150 DEG C; and (4) heating the reaction kettle to 200-210 DEG C under the agitating state, and obtaining rubber asphalt.

Embodiment 3

The rubber asphalt cited in the embodiment comprises following components in ratio by weight: 4 to 4 of 70# matrix asphalt to rubber powder modifier; the rubber powder modifier comprises the following components in ratio by weight: 94 to 6 of waste tire powder to hexanediol.

The rubber asphalt of the embodiment is prepared by the following method comprising the steps of (1) adding hexanediol into waste tire powder according to a ratio by weight of 94 to 6 of waste tire powder to hexanediol, mixing and wetting the mixture to obtain rubber powder modifier;

(2) placing the matrix asphalt into a reaction kettle, heating the matrix asphalt to 160-170 DEG C;

(3) adding the rubber powder modifier in the reaction kettle with a weight ratio of 4 to 4 of matrix asphalt to rubber powder modifier under the condition that the temperature is kept at 160 to 170 DEG C; and (4) heating the reaction kettle to 200-210 DEG C under the agitating state, and obtaining rubber asphalt.

The high content wet mixed rubber asphalt prepared by the three embodiments has the characteristics as follows:

Embodiment 1: the ductility at 5 DEG C is 13 cm, the penetration number at 25 DEG C is 75, and the softening point is 53 DEG C.

Embodiment 2: the ductility at 5 DEG C is 16 cm, the penetration number at 25 DEG C is 72, and the softening point is 76 DEG C.

Embodiment 3: the ductility at 5 DEG C is 19 cm, the penetration number at 25 DEG C is 68, and the softening point is 90 DEG C.

The invention claimed is:

1. A method of preparing rubber asphalt, comprising:

adding hexanediol to waste tire powder in a ratio by weight of 94-96 waste tire powder to 6-4 2,5-dimethyl-2,5-hexanediol;

mixing and wetting the waste tire powder with the hexanediol to obtain rubber powder modifier;

placing matrix asphalt in a reaction kettle;

heating the matrix asphalt to 90-170 degrees Centrigrade;

adding the rubber powder modifier to the reaction kettle in a ratio by weight of 4 matrix asphalt to 1-4 rubber powder modifier under the condition that the temperature is kept at 90-170 degrees Centrigrade;

agitating the added rubber powder modifier and the matrix asphalt; and heating the reaction kettle to 190-210 degrees Centrigrade to obtain rubber asphalt.

2. A method of preparing rubber asphalt, comprising:

adding hexanediol to waste tire powder in a ratio by weight of 94-96 waste tire powder to 6-4 2,5-dimethyl-2,5-hexanediol;

mixing and wetting the waste tire powder with the hexanediol to obtain rubber powder modifier;

placing matrix asphalt in a reaction kettle;

heating the matrix asphalt to 90-170 degrees Centrigrade;

adding the rubber powder modifier to the reaction kettle in a ratio by weight of 1 matrix asphalt to 1 rubber powder modifier under the condition that the temperature is kept at 90-170 degrees Centrigrade; and agitating the added rubber powder modifier and the matrix asphalt; and heating the reaction kettle to 190-210 degrees Centrigrade to obtain rubber asphalt.

* * * * *